United States Patent [19]

Lienhard et al.

[11] 3,883,858

[45] May 13, 1975

[54] MAGNETORESISTIVE READOUT TRANSDUCER FOR SENSING MAGNETIC DOMAINS IN THIN FILM MEMORIES

[75] Inventors: Heinz Lienhard, Greifensee, Switzerland; Walter S. Carter, Ruislip, England; Irving W. Wolf, Palo Alto, Calif.

[73] Assignee: Ampex Corporation, Redwood City, Calif.

[22] Filed: Dec. 17, 1973

[21] Appl. No.: 424,924

[52] U.S. Cl. .................. 340/174 EB; 340/174 CA; 340/174 TF; 340/174 MC

[51] Int. Cl. ...................... G11c 11/14; G11c 19/00

[58] Field of Search. 340/174 CA, 174 EB, 174 TF, 340/174 MC

[56] References Cited

UNITED STATES PATENTS

| | | | |
|---|---|---|---|
| 3,008,128 | 11/1961 | Powell | 340/174 WA |
| 3,531,780 | 9/1970 | Huijer | 340/174 EB |
| 3,820,089 | 6/1974 | Lama | 340/174 CA |

OTHER PUBLICATIONS

IBM Tech. Disc. Bull., "Magnetic Bubble Sensing," by Bailot et al., Vol. 13, No. 10, 3/71 pp. 3100, 3101.

IBM Tech. Disc. Bull., "Bubble Domain Sensor Arrays for Magnetic Discs," by Chang et al.; Vol. 14; No. 7; 12/71; pp. 2121, 2122.

*Primary Examiner*—Stanley M. Urynowicz, Jr.

[57] ABSTRACT

A magnetoresistive bridge formed of specific magnetoresistive elements is disposed on a monolithic substrate in conjunction with a thin film shift register. At least one (active) element of the bridge is placed in the region of the last domain position in a shift register channel. At least one other (balance) element of the bridge is spaced from the magnetic structure, whereby the combination balances the bridge while compensating for temperature variations. In one embodiment, two active arms of a four-element bridge are arranged such that a bipolar sense signal is obtained as a "1" passes into the last domain position. The remaining balance elements are spaced from the magnetic structure to provide compensation for noise, as well as temperature variations. A readout circuit provides an amplifier combination which samples the bipolar signal during selected time windows to enhance the sense signal output generated by the bridge.

2 Claims, 11 Drawing Figures

MAGNETORESISTIVE READOUT TRANSDUCER FOR SENSING MAGNETIC DOMAINS IN THIN FILM MEMORIES

BACKGROUND OF THE INVENTION

1. Field

The invention relates to apparatus for sensing domains in a shift register, and particularly to a magnetoresistive readout device with a configuration which detects the domain field rather than the flux change, to provide readout of magnetic domain shift registers, and the like.

2. Prior Art

Magnetic thin film type of shift registers have received considerable attention in the past, whereby feasibility of such configurations has been demonstrated. However, one area which causes difficulty in the continued development of thin film magnetic shift registers is the low read signal which is obtained from the conventional sense loop used to provide readout, which in turn is caused by the minute flux available from the single magnetic domain instantaneously being detected. Thus conventional readout devices employing induction sensing via a sense loop provide poor results. In addition, the available sense signal from readout devices which detect the domain field is also relatively small, while the D.C. offset due to fabrication tolerances may be as much as 10 millivolts. Thus a readout circuit capable of enhancing the (bipolar) sense signal generated by the readout device is desirable.

In addition, variations in ambient temperature, and in the temperature of the magnetoresistive sense element due to sense current variations, causes resistivity variations and thus inaccuracies in the readout signal generated by the elements. Thus means must be provided to compensate, not only for ambient temperature variations, but also for variations of sense element resistivity due to heating thereof caused by attempting to apply a maximum drive current through the element.

SUMMARY OF THE INVENTION

The invention circumvents the aforementioned shortcomings of the prior art by providing a multiple, thin film, readout configuration which employs the magnetoresistive effect to detect the small domain field, rather than the usual flux change, of the recorded magnetic domains in a shift register. To this end, a multiple element, magnetoresistive bridge is disposed on a monolithic substrate integral with the thin film shift register. At least one of the elements of the bridge is disposed adjacent the last domain position in respective channels of the shift register, and is termed an active, or sense element. At least one other element is disposed away from the magnetic structure of the domain channels and provides a balance element for balancing the bridge while compensating for temperature variations. In an optimum embodiment, two sense elements of the bridge are disposed such that a bipolar signal is obtained as a 1 passes into the last domain position of the register channel under the sense elements.

Optimally, the four-element bridge is deposited directly on top of an insulation layer (e.g., silicon monoxide) which is integral with the channels of the magnetic domain shift register. Thus the two sense elements are disposed in close proximity and in selected register to the last magnetic domain of the respective channel insuring good magnetic coupling between the stray field from the domain, and the sense element. The layout of the bridge minimizes the coupling area for inductive noise coupling. In this way a low noise, temperature insensitive, readout element is obtained.

One embodiment of the invention readout circuit includes a sense amplifier to supply sufficient gain, and sample and hold means to, in effect, allow a second differential amplifier thereof to take the difference between the positive and the negative voltages of the bipolar sense signal generated by the sense elements of the bridge, wherein signal sampling is performed during selected low noise, time windows. Such a readout circuit enhances the sense signal from the bridge, while compensating for any D.C. offset due to fabrication tolerances.

DESCRIPTION OF THE PREFERRED EMBODIMENTS

Figure 1:
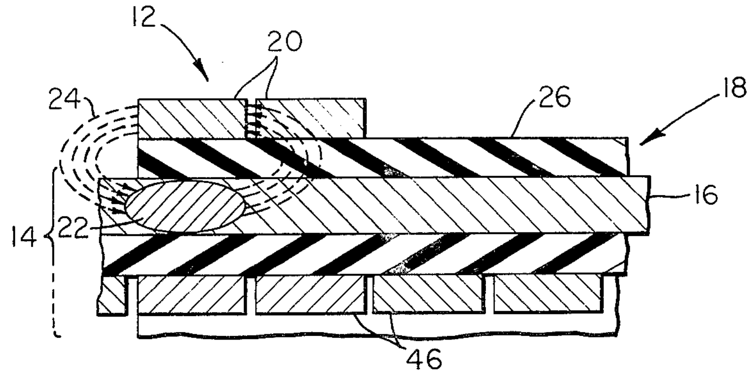
FIG. 1 is a partial cross-section depicting an exemplary structure for the magnetoresistive readout device of the invention in combination with a thin film shift register, by way of example only.
Figure 2:
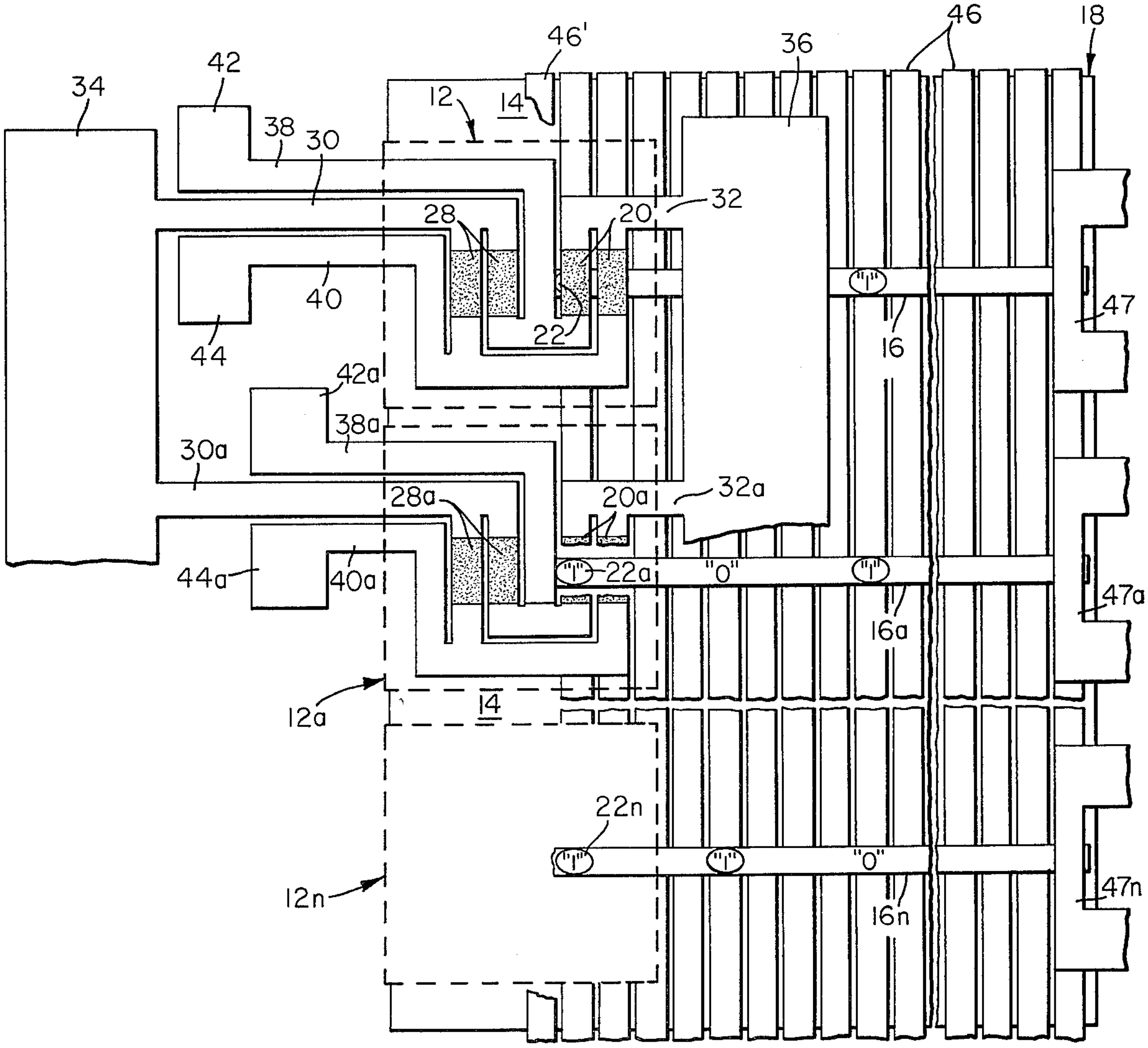
FIG. 2 is a plan of the invention readout device and thin film shift register of FIG. 1, wherein the proportions of the layout are selected for clarity.

Referring to FIGS. 1 and 2 the invention combination contemplates a series of magnetoresistive bridges 12, 12*a* . . . 12*n* selectively disposed on a monolithic substrate 14 in register with respective ends of storage channels, 16, 16*a* . . . 16*n* of a thin film register 18. Two of the elements of the bridge (herein termed "active" or "sense" elements 20, 20*a* . . . 20*n*) are disposed immediately adjacent and in register with last domain positions 22, 22*a* . . . 22*n* in the respective channels 16, 16*a* . . . 16*n* of the register, to allow optimum magnetic field coupling therewith, as depicted by magnetic flux lines 24. In particular, the sense elements are disposed upon an insulation layer 26 of an insulating material with a good surface for deposition thereon of the thin film element, such as, for example, silicon monoxide, Kapton (a trademark of Dupont), etc. The insulation layer 26 is then disposed over the magnetic storage channels of the register. The other two elements (herein termed "balance" elements 28, 28a . . . 28n) are spaced from the magnetic structure of the respective storage channels, and provide means for balancing the bridge and for compensating for temperature variations. In the example herein, the pairs of sense elements 22–22n are arranged adjacent their respective last domain positions within respective channels, to generate a bipolar signal when a magnetic domain representing a 1 passes into the last domain position. It is preferable that the magnetoresistive elements be fabricated of a magnetic material such as, for example, permalloy with an optimally low anisotropy field $H_k$ along the longer axis of the film element. However, any value of $H_k$ less than approximately 20 oersteds may be employed. A further description of materials, the element dimensions, and their manner of fabrication is shown in U.S. Pat. No. 3,493,694, assigned to the assignee of this application.

As may be seen in FIG. 2 (and in part in FIGS. 6–10 infra) the sense and balance magnetoresistive elements 20, 28 respectively are electrically connected in a bridge configuration with conductors 30, 30a . . . and 32, 32a . . . of successive bridges leading to common current busses 34, and 36, respectively. Conductors 38 and 40 are coupled to the other ends of respective magnetoresistive elements 20, 28, and lead to contact tabs 42, 44. The conductors 30, 32, 38, 40, as well as common busses 34, 36 and tabs 42, 44, are deposited during the electrodeposition processes employed to fabricate the integral structure of the magnetoresistive bridge(s) and the thin film register. The various tabs 42, 42a . . . and 44, 44a . . . are coupled to a suitable readout circuit (e.g., FIGS. 6–10) which provides a logic output indicative of the domains detected by the bridge. The common busses 34, 36 are coupled to a current source (FIGS. 6-11) which provides the current $I_D$ to the elements 20, 28. The register 18 is shown herein with conventional shift lines 46 and write lines 47, 47a . . . etc., which operate in usual fashion to propagate and nucleate the domains in the storage channels 16–16n as described, for example, in U.S. Pat. No. 3,723,983 assigned to assignee of this application.

It is to be understood that any number of channels 16–16n may be employed in the storage register, and accordingly a like plurality of magnetoresistive bridges 12–12n in accordance with the invention combination also are employed, one for each channel of the storage device. The plurality of channels are read out simultaneously or successively during each cycle of the register shift lines 46. The bridges are integrally formed upon the common substrate of the storage device, to define generally a common plane. Multiple planes may be disposed upon each other as in conventional storage devices to provide stacked planes which include the respective bridge configurations of the invention. Examples of thin film shift register configurations including storage channel widths, domain lengths and widths, field values, film coercivities, etc., may be seen in the above-mentioned U.S. Pat. 3,723,983.

Figure 3:
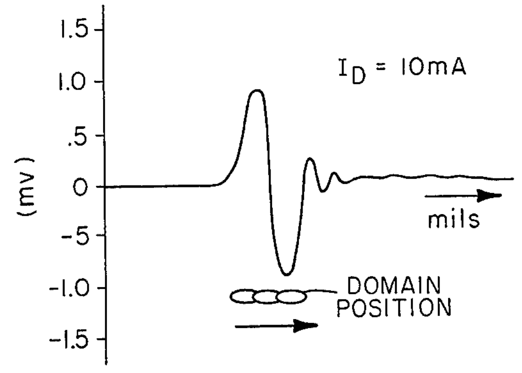
FIG. 3 is a graph depicting the sense signal generated with movement of a magnetic domain past a pair of sense elements.

In accordance with one embodiment of the invention, movement of the domain 22 with respect to the pair of sense elements 20 generates the desired bipolar sense signal depicted in FIG. 3. The maximum positive sense signal output is obtained when the domain 22 is centered under the first of the pair of sense elements 20 of the magnetoresistive bridge 12. When the domain is symmetrically positioned under the two sense elements 20, the signals generated by the elements cancel each other and the net output is zero, as shown in the FIG. 3. When the domain moves further to a position beneath the second of the pair of elements 20, a maximum negative sense signal output is generated via the bridge 12. The reverse domains are then conventionally disposed of as by means of a final, extra, shift line 46'.

Experiments show that a linear relation exists between the sense signal output and the sense element drive current $I_D$ (FIG. 4), as long as the latter is kept to a value below approximately 15 milliamps. At larger values of $I_D$ heating effects generate nonlinearities in the bridge. From the measured sense output $\Delta V$, the element current $I_D$ and the element resistance $R_S$ the relative resistance change $\Delta R/R_S$ is obtained.

$$\frac{\Delta R}{R_s} = \frac{\Delta V}{R_s \cdot I_D/2} = \frac{0.9\text{ mV}}{33\Omega\ 5\text{mA}} = 0.55\%$$

The maximum $\Delta R/R_S$ that can be expected for thin NiFe film (approximately 300A) is approximately 1%. This result is consistent with the sense signal versus the applied field curve shown in FIG. 4, which was obtained by applying a local (external) magnetic field $H_A$ of successive values to the magnetoresistive sense elements 20 ranging, for example, from −10 to +10 oersteds. In a comparison of FIGS. 3 and 4, it is concluded that in actual application during readout, the magnetic domain field is able to drive the magnetoresistive elements 20 to about 50% of their saturation level.

Figure 4:
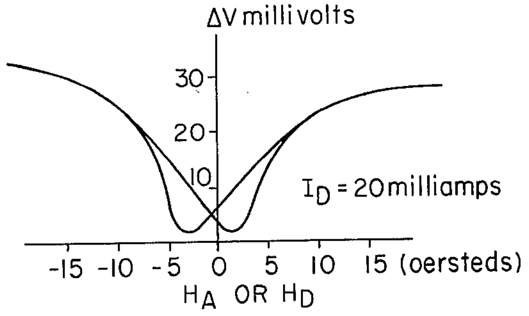
FIG. 4 is a graph depicting the relationship between the sense signal and the domain field, for an applied D.C. current through the bridge element.

FIG. 4 therefore illustrates a plot of the sense signal $\Delta V$ as a function of a domain field $H_D$ for an applied D.C. current through the bridge of $I_D = 20$ mA. It may be seen that 90% of the maximum obtainable $\Delta V$ is obtained for $H_D$ approximately equal to 4 oersteds.

Figure 5:
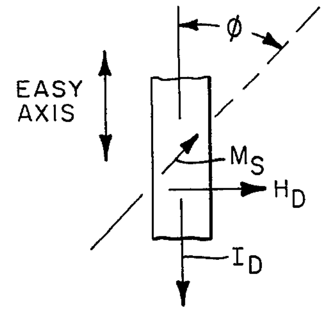
FIG. 5 is a plan of a length of magnetoresistive film, illustrating the relationship between the rotation of magnetization from the easy axis and the applied current direction, with the application of a hard axis domain field.

When the domain, and thus the domain field, is applied in a direction perpendicular to the easy axis of the sense elements 20, the magnetization $M_s$ rotates out of the easy axis and forms an angle $\phi$ with respect to the direction of the current $I_D$ (FIG. 5). The resulting resistance change $\Delta R = \Delta R_{max} \cos^2\phi$. Therefore a maximum effect is obtained if the magnetization $M_s$ rotates 90°, even for the small domain fields $H_D$. As may be seen, it therefore is preferable, though not necessary, that the anisotropy field $H_k$ of the thin film elements be made small.

Figure 6:
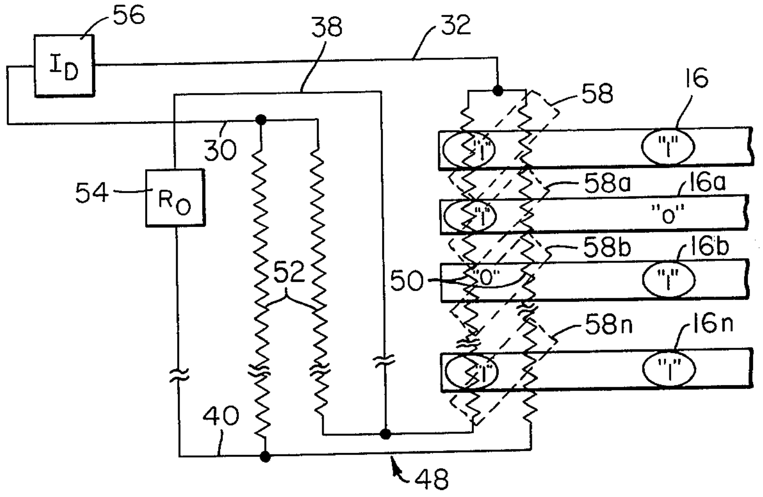
FIG. 6 is a plan in simplified schematic of an alternate embodiment of the readout device of the invention, employing common sense and balance elements, and depicting the associated readout circuit in block diagram.

Referring now to FIG. 6 there is shown an alternative embodiment of the invention in combination with a thin film register structure, wherein like components employ the same numerals as in FIGS. 1, 2. However, the individual sense and balance elements 20, 20a . . . 20n and 28, 28a . . . 28n respectively of FIGS. 1, 2 are replaced by single elongated magnetoresistive elements 50, 52 which extend along the last domain positions of all the storage channels 16–16n forming one plane of the shift register. Thus, only one pair of conductors 38, 40 are required to couple a single bridge 48 to an amplifier readout circuit 54. Likewise, a pair of conductors 30, 32 are connected to the other ends of the respective elongated magnetoresistive elements 50, 52 and thence across a current source 56. Since the sense elements 50 extend over a plurality of storage channels 16, read drive lines 58–58$n$ are employed to determine which of the domains in the last position of the channels 16–16$n$ respectively is being detected; i.e., which bridge 48 is being used. As generally known in the art, the read drive lines 58–58$n$ provide means for rotating the magnetization of the domains to allow detection via the bridge. It may be seen that the common bridge configuration of FIG. 6 requires simpler bridge fabrication, but is more complex in also requiring a separately deposited layer of read drive lines 58–58$n$. The FIG. 6 system requires only four conductors, whereas the individual bridge system requires four conductors for each bridge, i.e., four connections to each bridge in each channel of the shift register. The bridge configuration of FIG. 2 with individual sense elements provides a larger signal readout per channel, whereas the common sense elements 50 of FIG. 6 provide a less sensitive detection since a single domain field must be detected by the entire length of the sense elements.

Figure 7:
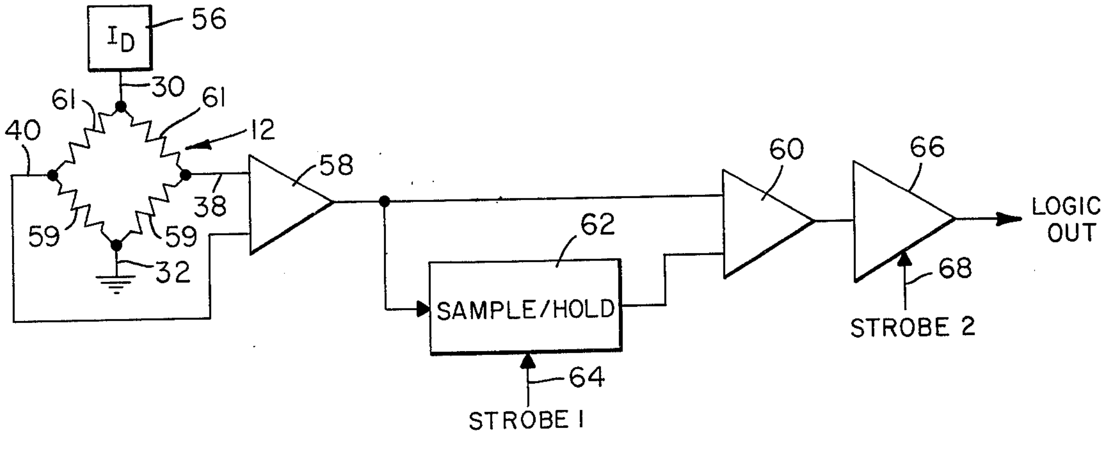
FIG. 7 is a block diagram of one embodiment of the readout electronics employing sampling during selected time windows to enhance the signal-to-noise ratio.
Figure 8:
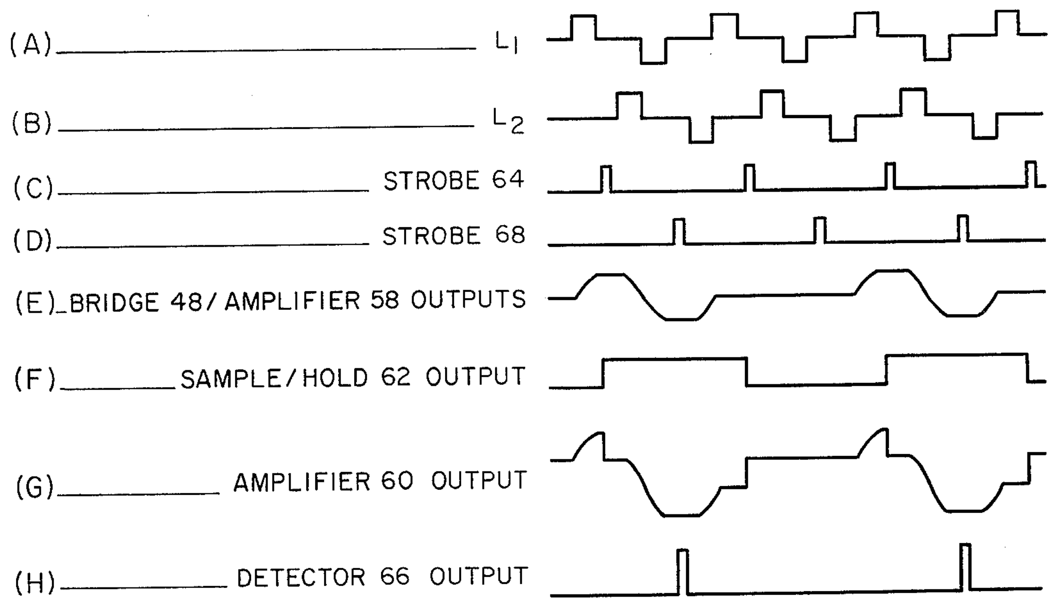
FIG. 8 is a graph depicting the timing waveforms for the shift and read cycles of the system of FIG. 7.

Referring now to FIG. 7 there is shown in block diagram an example of a circuit which may be employed as the readout circuit of FIGS. 2, 6. A typical bridge readout circuit may comprise a voltage sensing device which detects any unbalance between the active and balance elements. More particularly, the readout circuit may comprise a differential amplifier 58 coupled across the bridge 12, whereby the degree of bridge unbalance caused by the presence of a magnetic domain under the active elements is detected as a voltage difference by the amplifier 58. Such a relatively simple readout circuit may be utilized if the bridge is balanced, with minimized D.C. offset. The bridge 12 is coupled to ground at a common junction between active elements 59 and conductor 32, while the common junction between balance elements 61 is coupled to the source of current 56 via conductor 30. A number of bridges may be simultaneously or successively sampled in a multiple channel register.

Two conditions which are considered in the design of a sense amplifier for a more sophisticated readout circuit for magnetoresistive bridges are, that the read signal is relatively small (of the order of 2 millivolts peak-to-peak), whereas the D.C. offset due to fabrication tolerances of the bridge might be as much as 10 millivolts. Thus the readout circuit of FIG. 7 provides means first, for supplying sufficient gain to amplify the read signal and second, for overcoming the problem of offset by providing a sample and hold technique to, in effect, allow a second differential amplifier of the circuit to take the difference between the positive and negative values of the bipolar read signal generated as the magnetic domain moves under the two sense elements 59 of the bridge 12. To this end, the two junctions between respective elements 61, 59 are coupled to the readout circuit, beginning with the differential amplifier 58, whose output is introduced to a sample and hold circuit 62 as well as to another differential amplifier 60. The output from the sample and hold circuit 62 is introduced as the second input to the differential amplifier 60. A first strobe signal is introduced via 64 to the sample and hold circuit 62 to provide a selected sample time window. The output from second differential amplifier 60 is fed to a level detector 66 whose output comprises a logic signal indicative of the sense signal (and thus the binary bit) detected by the bridge 12. A second strobe signal is fed via 68 to the level detector 66 to provide a further sample time window.

The readout circuit is D.C. coupled to allow fast recovery from overloads, as well as from possible level changes caused by selecting different registers in a large storage system. All that is required for proper operation is that the bridge off balance does not saturate the system. This requirement is easily met with a 10 millivolt D.C. offset and 1 millivolt peak-to-peak signal.

Referring to FIGS. 7 and 8A–8H, in operation, the current source 56 provides current $I_D$ to drive the bridge 12. The bridge is initially balanced during fabrication in conventional manner, whereby no output is introduced to the first differential amplifier 58. During subsequent readout, movement of a magnetic domain, herein representing a 1 bit, into the last position of the respective channel, causes the generation of the bipolar signal of FIGS. 3 and 8E due to the change of resistance of the sense elements 59 causing an unbalance across the bridge. The bipolar signal is introduced to the first differential amplifier 58 (further described in FIGS. 9, 10) and the resulting amplified waveform (FIG. 8E) is delivered to the sample and hold 62 and to one input of the second differential amplifier 60. The second input to the differential amplifier 60 is provided via the sample and hold circuit 62 upon application thereto of the first strobe signal 64. The sample and hold circuit 62 acts as an analog memory which holds the last value sampled during application of the strobe signal 64 until the succeeding strobe 64 is applied. Thus in FIG. 8F, the sample and hold output may be a positive D.C. level (indicating a 1) or a 0 level (indicating a 0). Thus, FIG. 8C, 8D illustrates that the first and second strobe signals 64 and 68 in effect sample the bridge output when the domain is first under one, and then under the second of the sense elements 59. The read signal indicated in FIG. 8E depicts the theoretical signal generated by the domain passing under the bridge. The actual signal will show noise due to magnetic and capacitive coupling from the drive lines. The timing diagram shows, however, that these noise problems are eliminated by enabling the readout circuit only during periods when the shift lines associated with the last domain position are off, i.e., when the domain is stopped under the first, and again under the second, of the active elements 59. The amplifier 60 provides an output (FIG. 8G) corresponding to that of amplifier 58, but with a new baseline. Amplifier 60 thus takes the difference between the output of, and the actual input to, the sample and hold circuit 62. The detector 66 determines if the output from the amplifier 60 is negative D.C. value or zero, and provides a high or low logic output indicative of a 1 or a 0 bit respectively, when the second strobe signal 68 is applied to the detector.

As previously mentioned, the integral combination of the balanced bridge configuration and the readout circuit readily allows selection of one out of a plurality of registers forming a large storage system. To this end, the first differential amplifier 58 utilizes a first differential voltage gain stage 70 buffered by an emitter follower stage 72 (FIG. 9), coupled to a second differential voltage gain stage 74 buffered by an emitter follower stage 76 (FIG. 10). If a storage system utilizing the invention readout requires the selection of, for example, one out of 100 bridges, the first differential amplifier stage 70 may consist of 10 sections of the type shown in FIG. 9 (only two sections 78, 78$a$ are shown for clarity). Each bridge 12, 12*a* . . . , etc. is formed with respective channels in one plane, as in FIG. 2. Selecting a bridge 12, 12*a*, etc., by applying the current $I_D$ to the desired bridge, activates a differential pair of transistors 80, 82 while the other nine differential pairs of transistors remain disabled. The bridges in one plane are successively sampled during each cycle of the shift lines 46.

The first differential voltage gain stage 70 then drives the second differential voltage gain stage 74 of FIG. 10 via load resistors 71 and the emitter follower stage 72. Second stage 74 is formed, for example, of ten sections of differential pairs of transistors 84, 86 (only two sections 88, 88*a* are shown for clarity), wherein each stage is associated with a respective storage plane. One section out of the 10 is selected by steering the current $I_D$ from the bridge current source to the desired pair of transistors 84, 86. The remaining sections of differential pairs of transistors are cut off. The output from the second differential voltage gain stage 74, via load resistors and the follower stage 76, is shown in FIG. 8E. Thus utilizing the stages of circuitry of FIGS. 9 and 10, one out of 100 magnetoresistive bridges (12) may be selected to provide readout of a selected channel of a specific thin film register. The signal thus obtained via the bridge is amplified to provide an output voltage with a gain of approximately 200, which is applied to the sample and hold circuit 62 and the second differential amplifier 60 of FIG. 7 as previously described.

Figure 9:
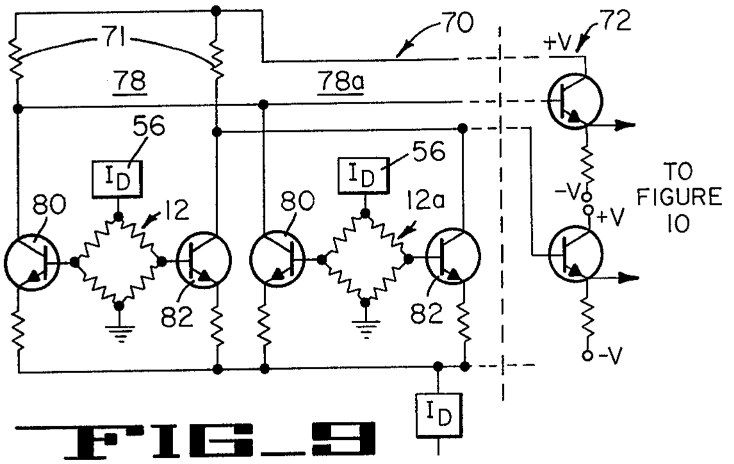
FIGS. 9 and 10 are schematic diagrams of respective blocks of the readout circuit of FIG. 7.
Figure 10:
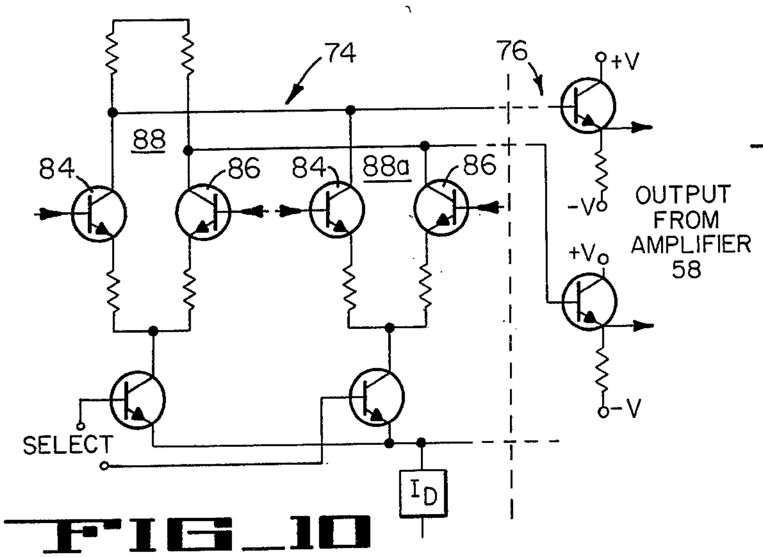

It is to be understood that the specific circuits of FIGS. 7, 9 and 10 are shown by way of example, and that other drift compensated differential amplifiers in the form of integrated circuit select amplifiers may be employed.

Figure 11:
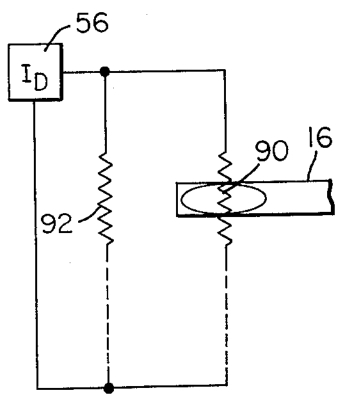
FIG. 11 is a simplified schematic diagram of another embodiment of the invention utilizing a "wye" (or "delta") "bridge" configuration.

Likewise, although a specific four-element (wheatstone) bridge configuration is described herein by way of example, any of the various bridges capable of measuring resistance changes may be employed, utilizing magnetoresistive thin film elements as the resistive arms of the bridge, as herein described. In general, at least two elements, i.e., one active and one balance element, are desired to provide temperature compensation. Noise compensation is provided by employing combinations of at least three or four elements. If a single active magnetoresistive element is used to sense the last domain, then a unipolar sense signal is generated by the bridge. It follows in a modification of the invention combination, the previous (four-element) bridge may be replaced by a two (or three) element wye of delta (bridge) configuration. In the latter configuration, as illustrated in FIG. 11, an active element 90 is disposed in magnetic coupled relation to the last domain position, while a balance element 92 is spaced from the magnetic structure of the register. The current $I_D$ from source 56 is applied to the elements 90, 92 whereby the difference between the currents therethrough appears across the elements at such time as a reverse domain (1) appears under the active element 90. This difference is a unipolar sense signal which is detected to indicate the presence of the reverse domain.

We claim:

1. A magnetoresistive readout system for integral disposition with readout regions of respective storage channels in a thin film storage device including first and second magnetoresistive element means formed of respective magnetoresistive thin films integrally disposed within the thin film storage device, comprising the combination of:

said first magnetoresistive element means including a pair of active magnetoresistive thin film elements disposed in magnetic field coupling relation with a selected readout region of a respective storage channel;

said second magnetoresistive element means including a pair of balance magnetoresistive thin film elements electrically coupled to the pair of active magnetoresistive thin film elements to define a balanced bridge configuration: wherein the bridge generates a bipolar read signal in direct response to the passage of a magnetic domain adjacent only the active elements; said second balance elements being sufficiently spaced from any storage channels to have no magnetic coupling with any magnetic domains;

readout circuit means coupled to the bridge defined by the active and balance pairs of elements for generating a logic output indicative of the presence and the absence of magnetic domains in magnetic coupling relation with only the active elements;

said readout circuit means including strobe means for selectively sampling the output of the bridge only during a time window commensurate with passage of the domain adjacent the pair of active elements, and differential amplifier means to provide a signal magnitude equal to the difference between the positive and negative values of the bipolar read signal generated during said time window and for generating binary logic output signals indicative of the presence or absence of a domain adjacent only the active elements.

2. The readout system of claim 1 wherein the active sense elements extend over the plurality of the storage channels in a single plane in magnetic field coupling relation to selected readout portions thereof; and the balance elements extend equally but in spaced relation from the storage channels; said thin film storage device including read drive lines for respective storage channels to rotate the magnetization of the domain in a selected storage channel during readout of that channel.

* * * * *